(12) United States Patent
Ivaturi et al.

(10) Patent No.: US 12,367,224 B2
(45) Date of Patent: Jul. 22, 2025

(54) TRANSFORMING DATA INTO DATA ENTITIES

(71) Applicant: Capital One Services, LLC, McLean, VA (US)

(72) Inventors: Ravi K. Ivaturi, Plainsboro, NJ (US); Ebrima N. Ceesay, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/538,123

(22) Filed: Dec. 13, 2023

(65) Prior Publication Data

US 2025/0200076 A1    Jun. 19, 2025

(51) Int. Cl.
*G06F 16/00* (2019.01)
*G06F 9/46* (2006.01)
*G06F 16/2457* (2019.01)
*G06F 16/28* (2019.01)

(52) U.S. Cl.
CPC ............ *G06F 16/288* (2019.01); *G06F 9/466* (2013.01); *G06F 16/24573* (2019.01)

(58) Field of Classification Search
CPC ............... G06F 16/2365; G06F 16/273; G06F 16/2393; G06F 2221/2151; G06F 21/6218; G06F 16/13; G06F 16/1734; G06F 16/178; G06F 21/552; G06F 16/182; H04L 63/0807; H04L 63/0884; H04L 63/101; H04L 41/28; H04L 63/20
See application file for complete search history.

(56) References Cited

U.S. PATENT DOCUMENTS 9,990,391 B1 *   6/2018   Cole ................... G06F 16/2365

* cited by examiner

*Primary Examiner* — Yicun Wu
(74) *Attorney, Agent, or Firm* — Harrity & Harrity, LLP

(57) ABSTRACT

In some implementations, a data management system may obtain, via a data interlocutor, a set of data intended for inclusion in a database, wherein the set of data is associated with at least one data type, wherein the set of data comprises at least one data value. The data management system may generate, via the data interlocutor, a set of data entities based on the set of data and a set of security metadata associated with the set of data, wherein the set of data entities comprises a data entity associated with a data value of the at least one data value, the data entity comprising transaction authorization information associated with the data value. The data management system may output, via the data interlocutor, the set of data entities for inclusion in the database.

20 Claims, 5 Drawing Sheets

TRANSFORMING DATA INTO DATA ENTITIES

BACKGROUND

Large amounts of data may be maintained in a database for use by a number of different users and/or applications. In some examples, security controls for restricting access to the database may be included at an application layer. However, as the number of applications and/or users increases, the inconsistency in security controls also increases, potentially compromising the security of the data.

SUMMARY

Some implementations described herein relate to a system for transforming data into data entities. The system may include one or more memories and one or more processors communicatively coupled to the one or more memories. The one or more processors may be configured to obtain, via a data interlocutor, a set of data intended for inclusion in a database, wherein the set of data is associated with at least one data type, wherein the set of data comprises at least one data value. The one or more processors may be configured to obtain, via the data interlocutor, a set of security metadata associated with the set of data, the set of security metadata comprising at least one subset of metadata associated with the at least one data value. The one or more processors may be configured to generate, via the data interlocutor, a set of data entities based on the set of data and the set of security metadata, wherein the set of data entities comprises a data entity associated with a data value of the at least one data value, the data entity comprising transaction authorization information associated with the data value. The one or more processors may be configured to output, via the data interlocutor, the set of data entities for inclusion in the database.

Some implementations described herein relate to a method of transforming data into data entities. The method may include obtaining, via a data interlocutor, a set of data intended for inclusion in a database, wherein the set of data is associated with at least one data type, wherein the set of data comprises at least one data value. The method may include generating, via the data interlocutor, a set of data entities based on the set of data and a set of security metadata associated with the set of data, wherein the set of data entities comprises a data entity associated with a data value of the at least one data value, the data entity comprising transaction authorization information associated with the data value. The method may include outputting, via the data interlocutor, the set of data entities for inclusion in the database.

Some implementations described herein relate to a non-transitory computer-readable medium that stores a set of instructions. The set of instructions, when executed by one or more processors of a device, may cause the device to obtain, via a data interlocutor, a set of data intended for inclusion in a database, wherein the set of data is associated with at least one data type, wherein the set of data comprises at least one data value. The set of instructions, when executed by one or more processors of the device, may cause the device to generate, via the data interlocutor, a set of data entities based on the set of data and a set of security metadata associated with the set of data, wherein the set of data entities comprises a data entity associated with a data value of the at least one data value, the data entity comprising transaction authorization information associated with the data value. The set of instructions, when executed by one or more processors of the device, may cause the device to output, via the data interlocutor, the set of data entities for inclusion in the database.

DETAILED DESCRIPTION

Figure 1A:
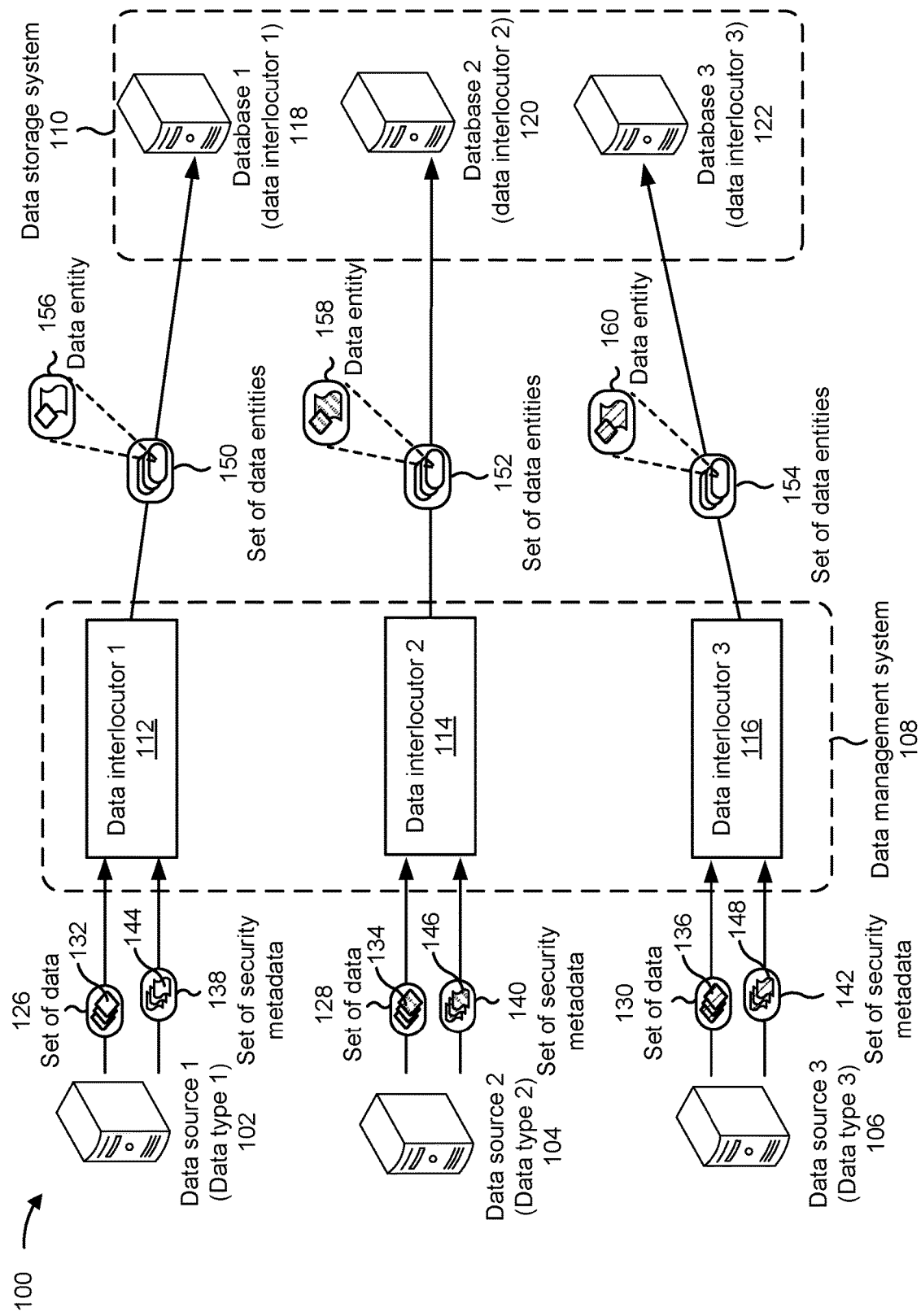
FIGS. 1A-1B are diagrams of an example implementation related to transforming data into data entities, in accordance with some embodiments of the present disclosure.

The following detailed description of example implementations refers to the accompanying drawings. The same reference numbers in different drawings may identify the same or similar elements.

Some implementations described herein enable the introduction of data interlocutors that facilitate storing data in a database by transforming the data into data entities having embedded security metadata. The data interlocutors may be data-specific (e.g., each data interlocutor may be associated with a respective data type) and may enforce rules for data transactions involving the data in the database. In some cases, all data transactions may occur through the data interlocutors. As a result, some implementations may enable maintaining data securely in a way that facilitates efficient regulation of data access by applications and users.

A device may execute one or more processes and/or one or more applications to enable the device to perform actions. In some cases, a process and/or application executed by the device may generate data associated with the actions performed by the device. As used herein, a device, application, and/or a component of a device and/or application, that generates data may be referred to as a data source. A data source may include, for example, a point-of-sale (POS) device, a personal computer, a workstation, a mobile device, and/or an application server, among other examples. A data source may be configured to transmit data to a data storage system that maintains a database for housing the data.

In some cases, authentication and security controls associated with the data can be managed at the application level. For example, an application instance may be running on a source device that generates data that is to be stored in a database. The application may contact an interface at the data storage system, encrypt the data, and transmit the data to the interface, which stores the data in the database. When the application later wishes to access the stored data (e.g., in response to a user input), the application may authenticate the user and retrieve the data from the database. In some cases, however, multiple applications and/or users may interact with the data. For example, an additional application may authenticate a user (e.g., a different user) and retrieve the data from the database. In some cases, though, the additional application may perform an authentication process (and/or other security operation) that is different than the application that stored the data, thereby resulting in an inconsistent security control associated with the stored data, which may result in the data being compromised.

Some techniques and implementations described herein enable controlling security of and access to data at a data level rather than at an application level. For example, some techniques and implementations described herein may use data interlocutors to provide a consistent security control associated with stored data. A data interlocutor is a computing entity (e.g., a software component, a hardware component, and/or a firmware component) that manages transactions associated with a data type. "Transaction" may refer to a communication between one computing entity and another computing entity to perform some action in association with a set of data. A set of data may include one or more data elements. In some implementations, a transaction may be performed to obtain a set of data from a data source, store a set of data in a database, retrieve (e.g., access) a set of data from the database, transmit a set of data from one computing entity to another computing entity, and/or provide a set of data to an application (e.g., via an application server), among other examples.

"Data type" may refer to any classification associated with data. For example, "data type" may refer to a data source type (a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device) associated with the data, an application type (e.g., computer vision, natural language processing, and/or sound categorization, among other examples) associated with the data, a content of the data (e.g., raw text files, audio clips, word processing documents, images, and/or email messages, among other examples), a format of the data (e.g., JavaScript Object Notation (JSON) format, comma-separated value (CSV) format, and/or extensible markup language (XML), among other examples), and/or a sensitivity of the data, among other examples. The sensitivity of the data may include a classification of the data as including sensitive data elements and/or non-sensitive data elements. Sensitive data elements may include personally identifiable information (PII), such as national identification numbers (e.g., social security numbers (SSNs) in the United States, social insurance numbers (SINs) in Canada, SSNs in the Philippines, permanent account numbers (PANs) in India, national insurance numbers (NINOs) in the United Kingdom, employer identification numbers (EINs) in the United States, individual taxpayer identification numbers (ITINs) in the United States, tax identification numbers (TINs) in Costa Rica, and/or other unique or quasi-unique identification numbers), credit card numbers, bank account numbers, passport numbers, driver's license numbers, and/or other PII. Non-sensitive data elements may be data elements other than sensitive data elements.

In some implementations, a different data interlocutor may be introduced for each data type of a number of data types. Since a database may maintain data of many different types of data, each type of data may have a corresponding data interlocutor configured to manage the storing of, access to, and security of the data of that type. Data interlocutors may be instantiated at the database, within an interface associated with the data base, and/or within applications associated with data sources. For example, in some implementations, a data interlocutor may be, be similar to, include, or be included within a data service (e.g., a standalone data service), an application programming interface (API), an agent within an application (e.g., via inter process communication (IPC)), and/or an integrated database component, among other examples.

In some implementations, all data transactions involving a data type may be required to occur via the corresponding data interlocutor. In this way, a data interlocutor corresponding to a data type may be able to ensure security and uniform management of all data of that data type in a database. To enforce in-band transactions (e.g., transactions involving a data type that are performed via the corresponding data interlocutor), in some implementations, a data interlocutor may use techniques such as data encryption to prevent or nullify the impact of any out-of-band data transactions (e.g., transactions involving a data type that are not performed via the corresponding data interlocutor).

In some implementations, a data interlocutor may obtain a set of data intended for inclusion in a database. The set of data may include one or more values. The data interlocutor also may obtain a set of security metadata associated with the set of data. The set of security metadata may include at least one subset of metadata associated with the at least one data value. For example, the set of security metadata may include, for each value of the set of data, a subset of security metadata. The security metadata may facilitate authentication and access controls associated with the corresponding data. For example, the security metadata may indicate users, user types (e.g., user roles), applications, and/or application types that are allowed to access the set of data.

In some implementations, the data interlocutor may generate a set of data entities based on the set of data and the set of security metadata. A data entity may include, for example, a data value and transaction authorization information associated with the data value. A data entity may include any type of aggregation of at least one data value and at least one security metadata element associated with the at least one data value. In some implementations, the at least one security metadata element may be embedded within a data entity along with the at least one data value. In some implementations, the at least one data value may be concatenated with the at least one security metadata element. In some implementations, the data entity may be a hash (e.g., a value created using a hash function) based on the at least one data value and the at least one security metadata element. In some aspects, the data entity may be a data object having attributes that include the at least one data value and the at least one security metadata element. In some implementations, the data interlocutor may output the set of data entities for inclusion in a database. "Database" may refer to one or more databases, data stores, and/or other structures for storing data. In some implementations, a data interlocutor may correspond to a database. For example, a first data interlocutor may correspond to a first database, a second data interlocutor may correspond to a second database, and so on.

In various implementations, as described herein, using data interlocutors may facilitate a consistent representation of the data and establishment and/or enforcement of authorization information (and, thus, security) associated with the data, regardless of the application that stores and/or accesses the data.

Figure 1B:
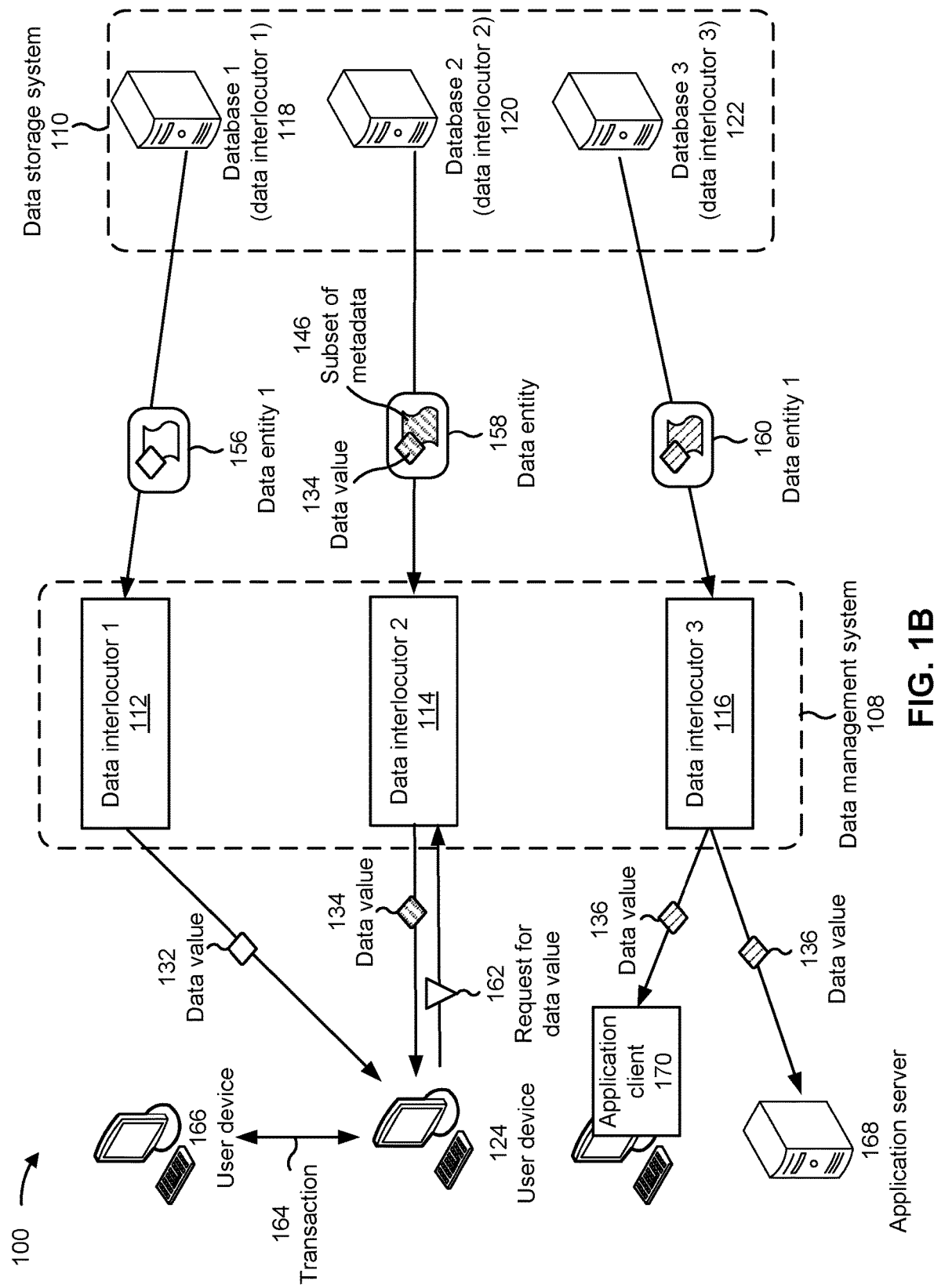

FIGS. 1A-1B are diagrams of an example implementation 100 related to transforming data into data entities. As shown in FIGS. 1A-1B, example implementation 100 includes data sources 102, 104, and 106; a data management system 108; and a data storage system 110. As shown, the data management system 108 may include one or more data interlocutors 112, 114, and 116. As shown, the data storage system 110 may include one or more databases 118, 120, and 122 that may be used to store one or more sets of data. In some implementations, the databases 118, 120, and 122 may correspond to respective interlocutors 112, 114, and 116. In some implementations, the databases 118, 120, and 122 may represent portions of a single database or database structure.

In some implementations, the data management system 108 may include, or be included in, the data storage system 110. In some implementations, the data management system 108 may be implemented as a standalone system and/or service (e.g., a software as a service (SaaS)). In some implementations, the data management system 108 may include, or be included in, an application system including one or more applications, application servers, and/or application clients, among other examples. Furthermore, as described herein, the data management system 108 may include, or may communicate with, a user device 124 (shown in FIG. 1B) that may allow one or more users and/or applications to interact with the data storage system 110.

As shown in FIG. 1A, the data management system 108 may receive, from the one or more data sources 102, 104, and 106, one or more sets 126, 128, and 130 of data. For example, in some implementations, a first data interlocutor (shown as "data interlocutor 1") 112 may receive a first set 126 of data, a second data interlocutor (shown as "data interlocutor 2") 114 may receive a second set 128 of data, and a third data interlocutor (shown as "data interlocutor 3") 116 may receive a third set 130 of data. In some implementations, each set 126, 128, and 130 of data may be associated with a respective data type. Each set 126, 128, and 130 of data may include at least one data value 132, 134, and 136, respectively.

As is further shown in FIG. 1A, the data management system 108 may receive, from the one or more data sources 102, 104, and 106, one or more sets 138, 140, and 142 of security metadata. Each set 138, 140, and 142 of security metadata may be associated with a respective set 126, 128, and 130 of data. Each set 138, 140, and 142 of security metadata may include at least one subset 144, 146, and 148 of metadata associated with the corresponding at least one data value 132, 134, and 136. For example, a subset 144 of metadata of the set 138 of security metadata may be associated with at least one data value 132 of the set 126 of data, a subset 146 of metadata of the set 140 of security metadata may be associated with at least one data value 134 of the set 128 of data, and a subset 148 of metadata of the set 142 of security metadata may be associated with at least one data value 136 of the set 130 of data.

As shown in FIG. 1A, the data management system 108 may generate one or more sets 150, 152, and 154 of data entities and may output the sets 150, 152, and 154 of data entities for inclusion in the one or more databases 118, 120, and 122. Each set 150, 152, and 154 of data entities may be generated by a corresponding data interlocutor 112, 114, and 116, respectively. Each data interlocutor 112, 114, and 116 may generate the respective sets 150, 152, and 154 of data entities using the respective sets 126, 128, and 130 of data and the respective sets 138, 140, and 142 of security metadata. Each set 150, 152, and 154 of data entities may include at least one data entity 156, 158, and 160, respectively. Each data entity 156, 158, and 160 may include transaction authorization information associated with the corresponding data value 132, 134, and 136, respectively. In some aspects, for example, each data entity 156, 158, and 160 may include the respective data value 132, 134, and 136 and the respective subset 144, 146, and 148 of metadata.

The respective subsets 144, 146, and 148 of metadata may include the transaction authorization information associated with the respective data values 132, 134, and 136. In some implementations, the transaction authorization information associated with a data value may indicate a user (an "authorized user") that is authorized to access the data value, a user type (an "authorized user type") that is authorized to access the data value, an application (an "authorized application") that is authorized to access the data value, an application type (an "authorized application type") that is authorized to access the data value, a transaction party (an "authorized transaction party") (e.g., an entity other than a user, such as, for example, a merchant, financial institution, and/or service provider, among other examples) that is authorized to access the data value, a transaction party type (an "authorized transaction party type") that is authorized to access the data value, and/or a type of transaction that is authorized in connection with the data value, among other examples. In some implementations, the one or more data interlocutors 112, 114, and 116 may be configured to encrypt the respective sets 150, 152, and 154 of data entities prior to outputting the respective sets 150, 152, and 154 of data entities for inclusion in the one or more databases 118, 120, and 122.

In some implementations, the data interlocutors 112, 114, and 116 may use the transaction authorization information to enforce security rules associated with corresponding data. For example, in some implementations, any retrieval of a data value from the data storage system 110 is processed through a data interlocutor 112, 114, or 116 associated with the data type of the data value. As shown in FIG. 1B, a user device 124 may provide a request 162 for a data value to the data management system 108. For example, the request 162 may be a request for a data value 134, which has a data type corresponding to the data interlocutor 114. In some implementations, the data management system 108 and/or the data storage system 110 may determine the data type associated with the request 162 and route the request, based on the data type, to the data interlocutor 114. In some other implementations, the data interlocutor 114 may be integrated into an application such that the request 162, when provided to the application, is provided, within the application, to the data interlocutor 114.

In response to the request 162, the data interlocutor 114 may obtain, from the database 120, the data entity 158 associated with (e.g., containing) the data value 134. Using the transaction authorization in the subset of metadata 146, the data interlocutor 2 114 may determine whether the request 162 satisfies one or more security rules associated with the data value 134. For example, the request 162 may include authorization request information. The authorization request information may include, for example, a user identifier (ID) (e.g., associated with a user of the user device 124), a user type ID (e.g., associated with the user of the user device 124), a transaction ID (e.g., associated with a transaction 164 between the user device 124 and a user device 166 associated with a transaction party), a transaction type ID (e.g., associated with the transaction 164 and/or the transaction between the user device 124 and the data storage system 110), a transaction party ID (e.g., associated with a transaction party corresponding to the user device 166), and/or a transaction party type ID (e.g., associated with a transaction party corresponding to the user device 166). The data interlocutor 114 may determine, using the authorization request information, whether access, by the user device 124 is authorized. If the access is authorized, the data interlocutor 114 may extract the data value 134 from the data entity 158 and may output the data value 134. For example, the data interlocutor 114 may provide the data value 134 to the user device 124. In some implementations, each data interlocutor may provide access to corresponding data values in this manner, as shown. In some implementations, as shown, an application (e.g., via an application server 168 and/or an application client 170 which may be running on a server, a user device, or any other type of computing device) may obtain a data value 136 via the data interlocutor 116.

By moving control over the security and authentication associated with data and access thereto from the application level to the data level, some implementations enable a scalable system in which data may be stored and accessed by multiple applications and/or users in a consistent manner. For example, in some implementations, two different applications may access a same data value from a database and a data interlocutor associated with the data value (e.g., by being associated with a data type thereof) may apply a consistent set of access and/or security rules associated with the data value across both applications. As a result, some implementations may reduce the likelihood that data in the database can be compromised by inconsistent security and/or access rules. Moreover, by implementing data security and access controls in data interlocutors at the data level, implementations of the system described herein may enable efficient scaling up (e.g., by adding applications and/or users that store and/or access data in association with the database).

As indicated above, FIGS. 1A-1B are provided as an example. Other examples may differ from what is described with regard to FIGS. 1A-1B.

Figure 2:
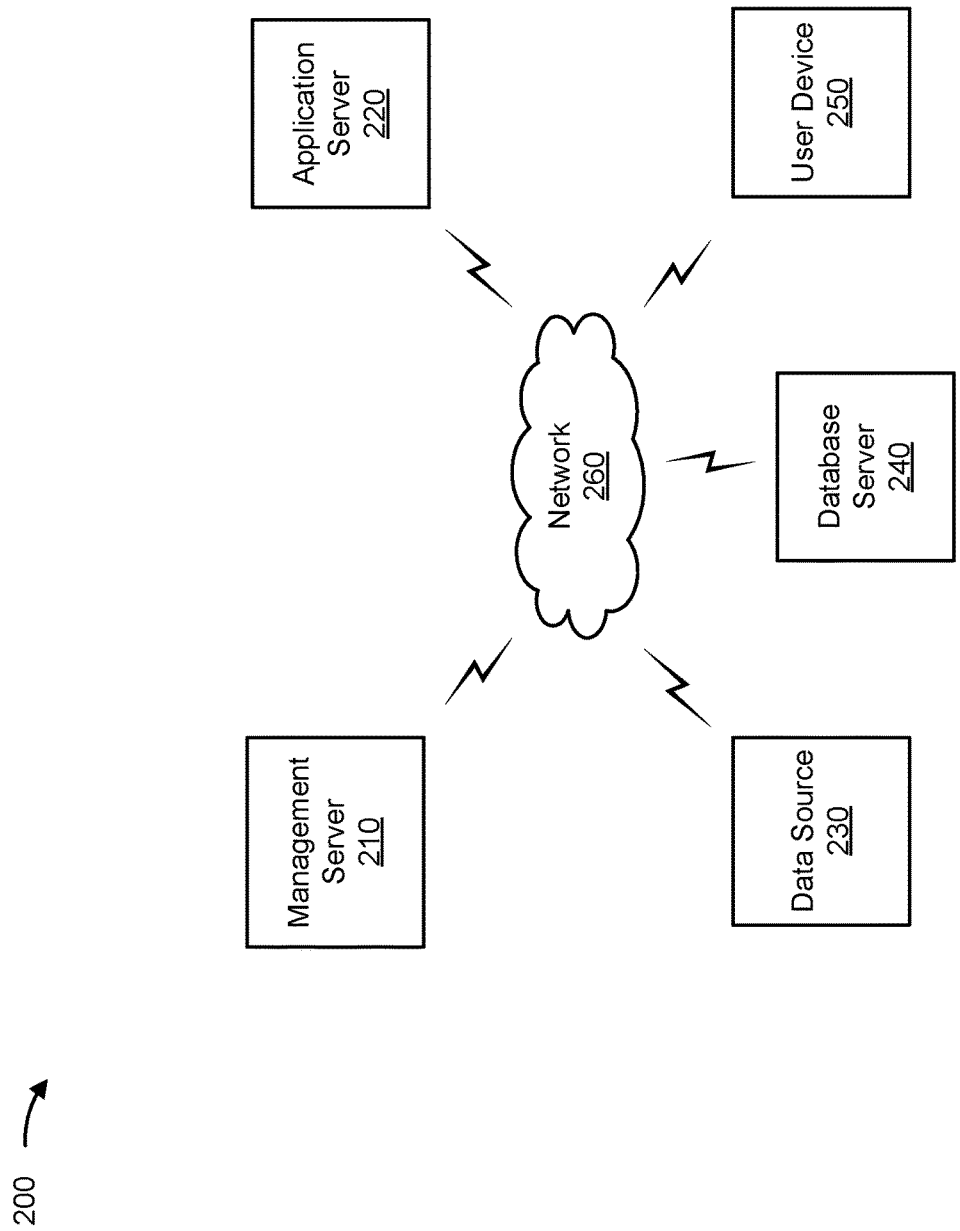
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a management server 210, an application server 220, a data sources 230, a database server 240, a user device 250, and a network 260. Devices of environment 200 may interconnect via wired connections, wireless connections, or a combination of wired and wireless connections. In some implementations, the management server 210 may include a plurality of management servers, the data source 230 may include a plurality of data sources 230, the database server 240 may include a plurality of database servers 240, and/or the user device 250 may include a plurality of user devices 250.

The management server 210 includes one or more devices capable of receiving, generating, storing, processing, providing, and/or routing information associated with managing and/or configuring one or more data interlocutors and/or transforming data into data entities (e.g., at an application server 220, a user device 250, and/or at the management server 210), as described elsewhere herein. The management server 210 may include a communication device and/or a computing device. For example, the management server 210 may include a server, such as an application server, a client server, a web server, a database server, a host server, a proxy server, a virtual server (e.g., executing on computing hardware), or a server in a cloud computing system. In some implementations, the management server 210 includes computing hardware used in a cloud computing environment.

An application server 220 includes one or more devices capable of receiving, generating, storing, processing, providing, and/or routing information associated with providing one or more application instances (e.g., at the application server 220 and/or the user device 250), as described elsewhere herein. The application server 220 may include a communication device and/or a computing device. For example, the application server 220 may include a server, a client server, a web server, a database server, a host server, a proxy server, a virtual server (e.g., executing on computing hardware), or a server in a cloud computing system. In some implementations, the application server 220 includes computing hardware used in a cloud computing environment. In some implementations, the application server 220 may include a wireless communication device, a mobile phone, a user equipment, a laptop computer, a tablet computer, and/or a desktop computer, among other examples.

A data source 230 includes one or more devices capable of receiving, generating, storing, processing, and/or providing information associated with generating data, requesting data, storing data, and/or accessing data, as described elsewhere herein. For example, the data source 230 may generate a set of data intended for inclusion in a database (e.g., via the database server 240) and may provide the set of data to a data interlocutor (e.g., instantiated at the data source 230, the management server 210, and/or the database server 240, as described elsewhere herein. In some implementations, the data source 230 may be, include, or be included in, a user device 250 and/or an application server 220. The data source 230 may include a communication device and/or a computing device. For example, the data source 230 may include a wireless communication device, a mobile phone, a user equipment, a laptop computer, a tablet computer, a desktop computer, a server, a client server, a web server, a database server, a host server, a proxy server, a virtual server (e.g., executing on computing hardware), or a server in a cloud computing system, and/or a similar type of device.

The database server 240 includes one or more devices capable of receiving, generating, storing, processing, and/or providing information associated with storing data entities, as described elsewhere herein. The database server 240 may include a communication device and/or a computing device. For example, the database server 240 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The database server 240 may communicate with one or more other devices of environment 200, as described elsewhere herein.

The user device 250 includes one or more devices capable of receiving, generating, storing, processing, and/or providing information associated with providing, requesting, accessing, and/or performing other transactions in connection with a set of data, as described elsewhere herein. The user device 250 may include a communication device and/or a computing device. For example, the user device 250 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 260 includes one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
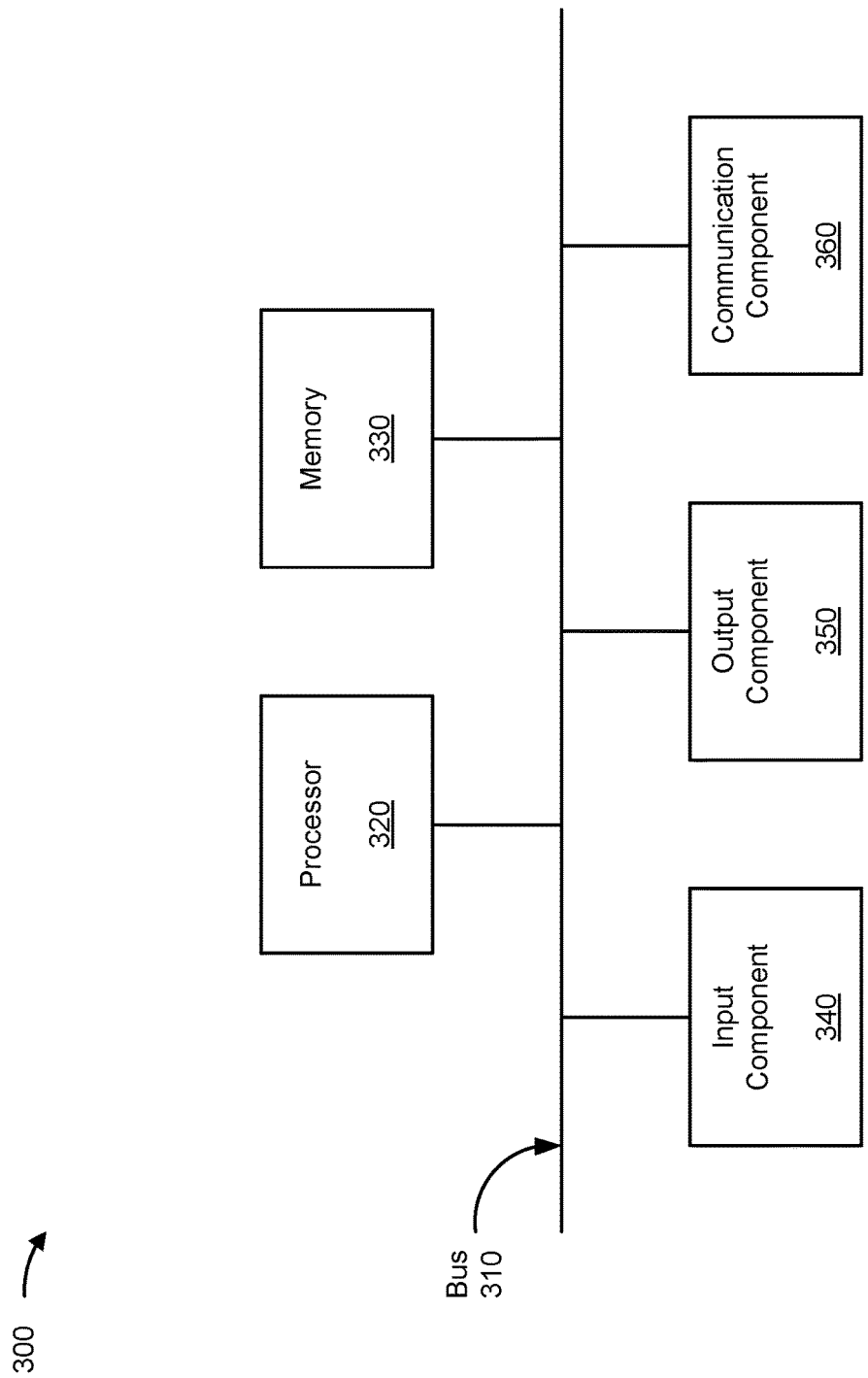
FIG. 3 is a diagram of example components of a device, which may correspond to the management server, the application server, the data source, the database server, and/or the user device, among other examples, in accordance with some embodiments of the present disclosure.

FIG. 3 is a diagram of example components of a device 300, which may correspond to the management server 210, the application server 220, the data source 230, the database server 240, and/or the user device 250, among other examples. In some implementations, the management server 210, the application server 220, the data source 230, the database server 240, and/or the user device 250 may include one or more devices 300 and/or one or more components of device 300. As shown in FIG. 3, device 300 may include a bus 310, a processor 320, a memory 330, an input component 340, an output component 350, and a communication component 360.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory). Memory 330 stores information and/or software related to the operation of device 300. For example, memory 330 may include a hard disk drive, a magnetic disk drive, an optical disk drive, a solid state disk drive, a compact disc, a digital versatile disc, and/or another type of non-transitory computer-readable medium.

Input component 340 enables device 300 to receive input, such as user input and/or sensed inputs. For example, input component 340 may include a touch screen, a keyboard, a keypad, a mouse, a button, a microphone, a switch, a sensor, a global positioning system component, an accelerometer, a gyroscope, and/or an actuator. Output component 350 enables device 300 to provide output, such as via a display, a speaker, and/or one or more light-emitting diodes. Communication component 360 enables device 300 to communicate with other devices, such as via a wired connection and/or a wireless connection. For example, communication component 360 may include a receiver, a transmitter, a transceiver, a modem, a network interface card, and/or an antenna.

Device 300 may perform one or more processes described herein. For example, a non-transitory computer-readable medium (e.g., memory 330) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
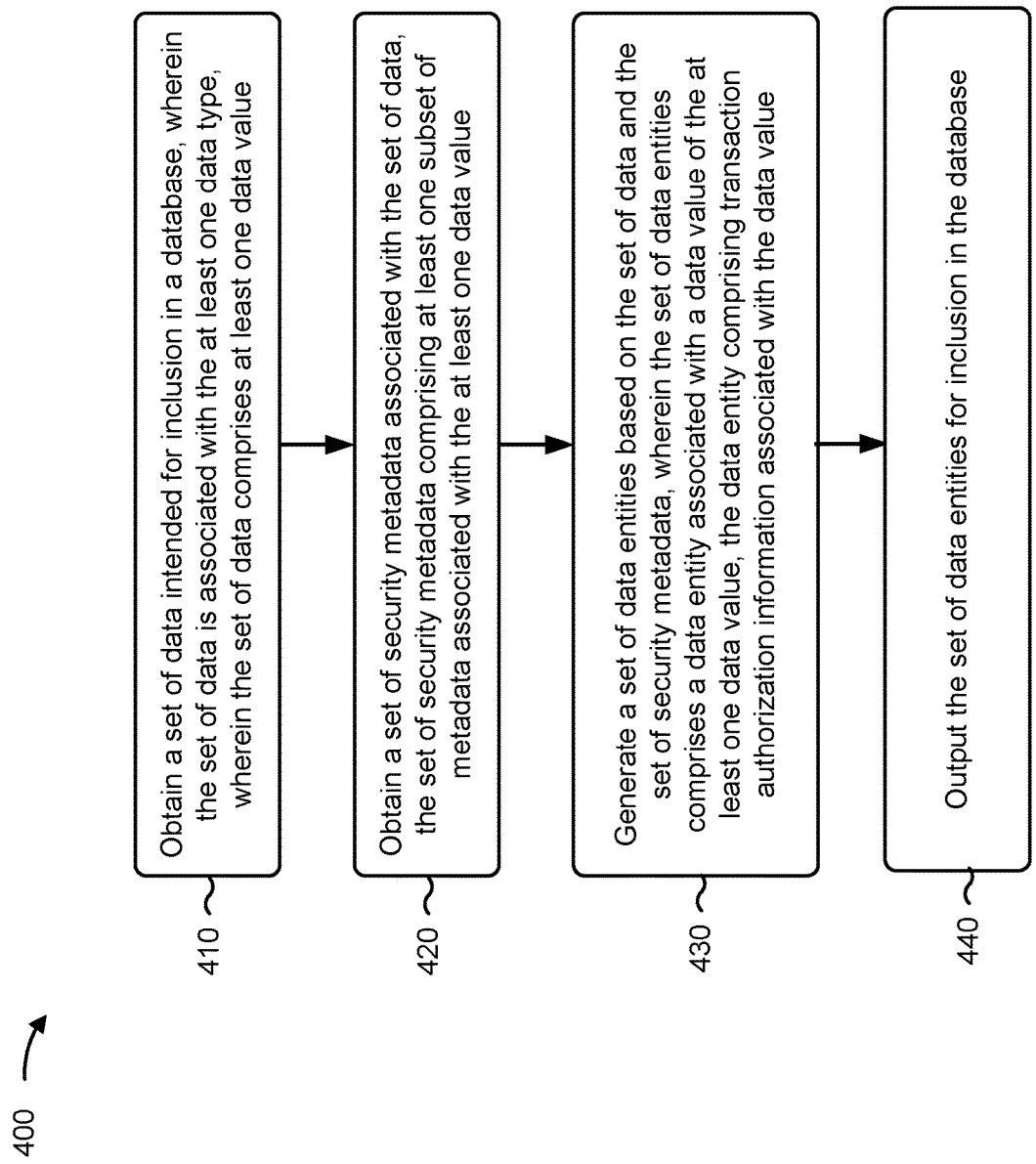
FIG. 4 is a flowchart of an example process associated with transforming data into data entities, in accordance with some embodiments of the present disclosure.

FIG. 4 is a flowchart of an example process 400 associated with transforming data into data entities. In some implementations, one or more process blocks of FIG. 4 may be performed by a data management system (e.g., the data management system 108), a data interlocutor (e.g., the data interlocutor 112, 114, and/or 116), a management server (e.g., the management server 210), a data source (e.g., the data source 230), a database server (e.g., the database server 240), a user device (e.g., the user device 250), and/or an application server (e.g., the application server 220. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining, via a data interlocutor, a set of data intended for inclusion in a database, wherein the set of data is associated with at least one data type, and wherein the set of data comprises at least one data value (block 410). As further shown in FIG. 4, process 400 may include obtaining, via the data interlocutor, a set of security metadata associated with the set of data, the set of security metadata comprising at least one subset of metadata associated with the at least one data value (block 420). As further shown in FIG. 4, process 400 may include generating, via a data interlocutor, a set of data entities based on the set of data and the set of security metadata, wherein the set of data entities comprises a data entity associated with a data value of the at least one data value, the data entity comprising transaction authorization information associated with the data value (block 430). As further shown in FIG. 4, process 400 may include outputting, via a data interlocutor, the set of data entities for inclusion in the database (block 440).

In some implementations, the process may include encrypting the set of data entities prior to outputting the set of data entities. In some implementations, the set of data entities may include at least one data object. In some implementations, the transaction authorization information indicates at least one of an authorized transaction type associated with the data value, an authorized transaction party associated with the data value, or an authorized user associated with the data value. In some implementations, the data interlocutor is associated with the at least one data type. In some implementations, the data interlocutor includes an API. In some implementations, the data interlocutor includes an agent component of an application, and at least one component of the application is instantiated on a source device associated with the set of data. In some implementations, the data interlocutor is a component of a data storage system including the database. In some implementations, process 400 further includes obtaining a request for the data value; obtaining, from the database, the data entity associated with the data value; extracting the data value from the data entity; and outputting the data value.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for transforming data into data entities, the system comprising:
   one or more memories; and
   one or more processors, communicatively coupled to the one or more memories, configured to:
      obtain, via a data interlocutor, a set of data intended for inclusion in a database, wherein the set of data is associated with at least one data type, wherein the set of data comprises at least one data value, and wherein the data interlocutor is particular to the at least one data type;
      obtain, via the data interlocutor, a set of security metadata associated with the set of data, the set of security metadata comprising at least one subset of metadata associated with the at least one data value;
      generate, via the data interlocutor, a set of data entities based on the set of data and the set of security metadata, wherein the set of data entities comprises a data entity associated with a data value of the at least one data value, the data entity comprising transaction authorization information associated with the data value; and
      output, via the data interlocutor, the set of data entities for inclusion in the database.

2. The system of claim 1, wherein the one or more processors are further configured to;
   encrypt, based on the at least one data type, the set of data entities prior to outputting the set of data entities.

3. The system of claim 1, wherein the data entity comprises a data object.

4. The system of claim 1, wherein the transaction authorization information indicates at least one of an authorized transaction type associated with the data value, an authorized transaction party associated with the data value, or an authorized user associated with the data value.

5. The system of claim 1, wherein the data interlocutor comprises an application programming interface.

6. The system of claim 1, wherein the data interlocutor comprises an agent component of an application, wherein at least one component of the application is instantiated on a source device associated with the set of data.

7. The system of claim 1, wherein the data interlocutor is a component of a data storage system including the database.

8. The system of claim 1, wherein the one or more processors are further configured to:
   obtain a request for the data value;
   obtain, from the database, the data entity associated with the data value;

extract the data value from the data entity; and
output the data value.

9. The system of claim 1, wherein each data type, of a plurality of data types, has a different corresponding data interlocutor.

10. The system of claim 1, wherein the one or more processors are further configured to:
generate, via another data interlocutor, another set of data entities based on another set of data intended for inclusion in a database, wherein the other set of data is associated with a particular data type that is different from the at least one data type, and wherein the other data interlocutor is particular to the particular data type.

11. A method of transforming data into data entities, the method comprising:
obtaining, via a data interlocutor, a set of data intended for inclusion in a database, wherein the set of data is associated with at least one data type, wherein the set of data comprises at least one data value, and wherein the data interlocutor is particular to the at least one data type;
generating, via the data interlocutor, a set of data entities based on the set of data and a set of security metadata associated with the set of data, wherein the set of data entities comprises a data entity associated with a data value of the at least one data value, the data entity comprising transaction authorization information associated with the data value; and
outputting, via the data interlocutor, the set of data entities for inclusion in the database.

12. The method of claim 11, further comprising encrypting the set of data entities prior to outputting the set of data entities.

13. The method of claim 11, wherein the data entity comprises a data object.

14. The method of claim 11, wherein the transaction authorization information indicates at least one of an authorized transaction type associated with the data value, an authorized transaction party associated with the data value, or an authorized user associated with the data value.

15. The method of claim 11, further comprising:
obtaining a request for the data value;
obtaining, from the database, the data entity associated with the data value;
extracting the data value from the data entity; and
outputting the data value.

16. A non-transitory computer-readable medium storing a set of instructions, the set of instructions comprising:
one or more instructions that, when executed by one or more processors of a device, cause the device to:
obtain, via a data interlocutor, a set of data intended for inclusion in a database, wherein the set of data is associated with at least one data type, wherein the set of data comprises at least one data value, and wherein the data interlocutor is particular to the at least one data type;
generate, via the data interlocutor, a set of data entities based on the set of data and a set of security metadata associated with the set of data, wherein the set of data entities comprises a data entity associated with a data value of the at least one data value, the data entity comprising transaction authorization information associated with the data value; and
output, via the data interlocutor, the set of data entities for inclusion in the database.

17. The non-transitory computer-readable medium of claim 16, wherein the one or more instructions, when executed by the one or more processors, further cause the device to encrypt the set of data entities prior to outputting the set of data entities.

18. The non-transitory computer-readable medium of claim 16, wherein the transaction authorization information indicates at least one of an authorized transaction type associated with the data value, an authorized transaction party associated with the data value, or an authorized user associated with the data value.

19. The non-transitory computer-readable medium of claim 16, wherein the data interlocutor comprises at least one of an application programming interface, an agent component of an application, or a component of a data storage system including the database.

20. The non-transitory computer-readable medium of claim 16, wherein the one or more instructions, when executed by the one or more processors, further cause the device to:
obtain a request for the data value;
obtain, from the database, the data entity associated with the data value;
extract the data value from the data entity; and
output the data value.

* * * * *